United States Patent Office 2,954,361
Patented Sept. 27, 1960

2,954,361

POLYMERS OF AN UNSATURATED BORAZOLE

Stephen J. Groszos and Stanley F. Stafiej, Stamford, Conn., assignors to American Cyanamid Company, New York, N.Y., a corporation of Maine No Drawing. Filed Feb. 21, 1958, Ser. No. 716,541

20 Claims. (Cl. 260—45.4)

This application is a continuation-in-part of our copending application Serial No. 647,936, filed March 25, 1957.

This invention relates to the production of new materials having valuable and characteristic properties that make them especially suitable for use in industry, for example, in molding, coating, laminating, impregnating, textile-treating, and adhesive applications, as neutron absorbers, gelling agents, and for other purposes. More particularly, the invention is concerned with polymers, both linear and cross-linked, of an unsaturated borazole.

The borazoles used in practicing the present invention may be represented graphically by the following general formula I
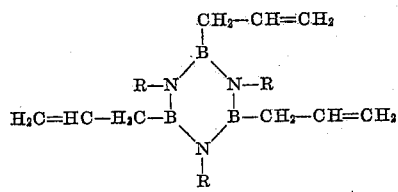

where R represents a member of the class consisting of hydrogen and alkyl (including cycloalkyl), aralkyl, aryl, and alkaryl radicals.

Illustrative examples of hydrocarbon radicals represented by R in the above formula are: methyl, ethyl, propyl, isopropyl, butyl, isobutyl, sec.-butyl, amyl, isoamyl, hexyl to tetracontyl, inclusive (both normal and isomeric forms), cyclopentyl, cyclohexyl, cycloheptyl, etc.; benzyl, phenylethyl, phenylpropyl, phenylisopropyl, phenylbutyl, fluorenyl, dinaphthylenemethyl, etc.; phenyl, biphenylyl or xenyl, naphthyl, anthryl, naphthyl-substituted anthryl and dianthryl, etc.; and tolyl, xylyl, ethylphenyl, propylphenyl, isopropylphenyl, butylphenyl, etc.

The term "a polymer" as used generically herein and in the appended claims with reference to an unsaturated borazole of the kind embraced by Formula I includes within its meaning both homopolymers and copolymers of such a borazole, for instance, copolymers of the defined borazole with a compound which is different therefrom, is copolymerizable therewith and contains a single —CH=C< grouping or a plurality of —CH=C< groupings, e.g., styrene, dimethyl styrene, methyl acrylate, methyl methacrylate, ethyl methacrylate, vinyl acetate, acrylonitrile, acrylamide, diallyl phthalate, triallyl citrate, tetrallyl silane, dimethyl itaconate, diethyl maleate, dipropyl fumarate, etc. The scope of the invention also includes method features whereby new and useful synthetic compositions are produced.

The polymers, especially the homopolymers and the linear copolymers, of this invention are characterized, in general, by the fact that they are capable of being cross-linked. Furthermore, whereas most of the conventional, linear, addition polymers have a softening point below 130° C. (e.g., within the range of about 90° to 110° C. in the case of the polystyrenes), in marked contrast the linear homopolymeric, unsaturated borazoles of this invention do not, in general, soften below about 170° C., while the insoluble, cross-linked homopolymers do not, in general, soften when heated up to 300° C.

It is one of the primary objects of the present invention to prepare a new class of polymers, including both homopolymers and copolymers, for use in industry.

Another object of the invention is to prepare linear polymers which are capable of being cross-linked.

Still another object of the invention is to prepare new boron-containing polymers.

Another object of the invention is to improve the usefulness of unsaturated borazoles of the kind embraced by Formula I whereby their field of utility is enhanced.

Other objects of the invention will be apparent to those skilled in the art from the following more detailed description.

Unsaturated borazoles of the kind embraced by Formula I are believed to be new chemical compounds. They are more fully described and are broadly and specifically claimed in our copending application Serial No. 647,936 filed March 25, 1957, now abandoned in favor of our copending application Serial No. 716,542, filed February 21, 1958, as a continuation-in-part of said application Serial No. 647,936 and of application Serial Nos. 647,934 and 647,935, the latter two also having been filed March 25, 1957.

A preferred compound used in practicing this invention is B,B′,B″-triallyl-N,N′,N″-triphenylborazole, the formula for which is II
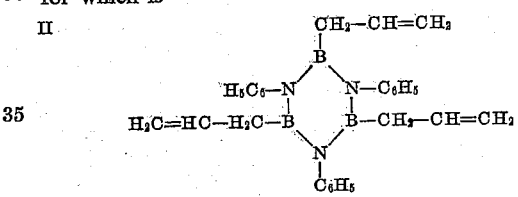

This compound also may be designated as B-triallyl-N-triphenylborazole. Other compounds embraced by Formula I that are within the scope of this invention (and which, for purpose of brevity, are named by the shorter nomenclature just indicated) include, for example, the following:

B-triallyl-N-tritolylborazole
B-triallyl-N-trimethylborazole
B-triallyl-N-tribenzylborazole
B-triallyl-N-tricyclohexylboraozle
B-triallyl-N-trixylylborazole
B-triallyl-N-trioctadecylborazole
B-triallylborazloe, the formula for which is III
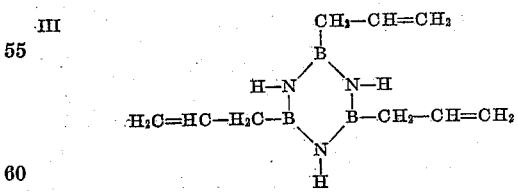

The compounds of this invention can be prepared by different methods. One suitable method comprises the dropwise addition of the appropriate Grignard reagent, R′MgX, where R′ represents the allyl radical,

—CH$_2$—CH=CH$_2$ and X represents a halogen, specifically Cl, Br, or I, to a slurry of the appropriate B,B′,B″-trichloroborazole suspended in a suitable liquid solvent that is inert during the reaction, e.g., ethers, dioxane, aromatic and aliphatic hydrocarbons, chlorobenzene, etc. The trichloroborazole employed is one represented by the general formula IV
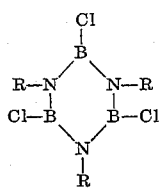

where R has the same meaning as that given above with reference to Formula I.

The addition of the Grignard reagent to the suspension of the trichloroborazole can be carried out at temperatures of, for example, from about 1° or 2° C. up to the boiling point of the particular solvent employed. After addition of the Grignard reagent over a period of up to about 3 hours, e.g., from about ½ to 2 hours, is complete, the reaction mass is allowed to reflux or is kept at a temperature at or above room temperature for a period of from a few minutes to several hours. After cooling to room temperature (if not already at that temperature) the unconsumed Grignard reagent is removed by any suitable means, e.g., by treating the mass with a suitable material that will react with the excess Grignard reagent. One example of such a material is an aqueous solution of an acid, for instance HCl.

A preferred method of isolating the borazole compound involves the careful titration of the reaction mass with a saturated aqueous ammonium chloride solution to the point at which the magnesium salts separate from a clear solution of the reaction product. After decanting and washing the solid residue with ether, the combined solutions are dried over anhydrous magnesium sulfate for about 16 hours at refrigerator temperature (0°–5° C.), filtered, the filtrate concentrated by volatilizing the solvent and methanol added to the hot solution until the latter becomes cloudy. After allowing this solution to stand at room temperature or lower, crystals of the product slowly form. Crystallization is completed by cooling to 0°–5° C. (or below 0° C. if necessary) for from several minutes to one hour. The product is then filtered and air-dried. It can be recrystallized from an ether-methanol mixture or from other suitable solvents or solvent mixtures.

The objects of the invention are accomplished, in general, by polymerizing an unsaturated borazole of the kind embraced by Formula I alone or while admixed with one or more (e.g., two, three, five, or any desired number) of other unsaturated substances which are copolymerizable therewith, examples of which have been given hereinbefore. The homopolymer or copolymer advantageously is produced, for instance, by polymerizing the unsaturated borazole, or a mixture thereof with one or more other unsaturated materials, under heat and with the aid of a polymerization catalyst or catalysts, or a catalyst system.

Examples of monomers containing a —CH=C< grouping, including those containing a $CH_2$=C< grouping, that can be copolymerized with a compound of the kind embraced by Formula I, which are different therefrom, and which can be polymerized either singly or with a plurality (two, three, four, or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the vinyl, isopropenyl, allyl, methallyl, crotyl, 1-chloroallyl, 2-chloroallyl, cinnamyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e.g., methacrylic, ethacrylic, propacrylic, etc., and arylacrylic, e.g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra - chlorostyrenes, -bromostyrenes, -fluorostyrenes, -methylstyrenes, -ethylstyrenes, -cyanostyrenes, etc., vinylnaphthalenes, vinylcyclohexanes, vinylfuranes, vinylpyridines, vinyldibenzofuran, divinylbenzenes, trivinylbenzenes, allylbenzenes, diallylbenzenes, N-vinylcarbazole, the various allyl cyanostyrenes, the various alpha-substituted styrenes and alpha-substituted ring-substituted styrenes, e.g., alpha-methyl styrene, alpha-methyl-paramethyl styrene, etc.; unsaturated ethers, e.g., ethyl vinyl ether, diallyl ether, ethyl methallyl ether, etc.; unsaturated acids and anhydrides, e.g., acrylic and methacrylic acids, maleic anhydride, etc.; unsaturated amides, for instance N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; butadienes, e.g., 1,3-butadiene, 2-chlorobutadiene, etc.; unsaturated polyhydric alcohol (e.g., butenediol, etc.) esters of saturated and unsaturated, aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Still other examples of comonomers for copolymerization with an unsaturated borazole of the kind embraced by Formula I are the mono- and dialkyl (e.g., mono- and dimethyl to -octadecyl, inclusive) esters of maleic, fumaric, citraconic, mesaconic and itaconic acids or their available anhydrides.

Other examples of monomers that can be copolymerized with the unsaturated borazole to produce our new copolymer compositions are the vinyl halides, more particularly vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added if needed in order to improve the compatibility and copolymerization characteristics of the mixed monomers.

Other and more specific examples of monomeric materials which can be mixed or blended with the unsaturated borazole, and the resulting homogeneous or substantially homogeneous, polymerizable composition then polymerized, as hereinafter more fully described, to yield new and valuable copolymer compositions are the different allyl compounds, especially those which have a boiling point of at least about 60° C. Of the monomeric materials which can be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that can be copolymerized with the unsaturated borazole are one or another or a plurality of the following (or a mixture thereof with another comonomer): allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl phosphate, trimethallyl phosphate, tetrallyl silicate, hexallyl disiloxane, etc. Other examples of allyl compounds that may be employed are given in, for example, Kropa U.S. Patent No. 2,510,503, dated June 6, 1950.

Among the comonomers which are preferred for use in carrying our invention into effect are the vinyl compounds, including the vinyl aromatic compounds, more particularly the vinyl aromatic hydrocarbons (e.g., styrene, the various dialkyl styrenes, etc.), and the vinyl aliphatic compounds, e.g., acrylonitrile, acrylamide, etc., and other compounds containing a $CH_2=C<$ grouping, e.g., the various substituted acrylonitriles (e.g., methacrylonitrile, ethacrylonitrile, phenylacrylonitrile, etc.), the various substituted acrylamides, e.g., methacrylamide, ethacrylamide, the various N-substituted acrylamides and alkacrylamides, for instance, N-methylol acrylamide, N-monoalkyl and -dialkyl acrylamides and methacrylamides, e.g., N-monomethyl, -ethyl, -propyl, -butyl, etc. and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the alkyl grouping, examples of which are given above, as well as other vinyl aromatic and vinyl aliphatic compounds, and other compounds containing a $CH_2=C<$ grouping.

An unsaturated alkyd resin or a plurality of such resins also may constitute the unsaturated material which is copolymerized with one or more unsaturated borazoles of the kind embraced by Formula I to produce new and valuable copolymer compositions. Such resins are reaction products of a polyhydric alcohol and an unsaturated polycarboxylic acid or anhydride, and they contain a plurality of polymerizably reactive alpha,beta-enal groups, that is, the grouping

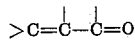

The unsaturated alkyd resins can be produced by various means, for example by the esterification of an unsaturated alpha,beta-polycarboxylic acid of the aliphatic series, more particularly an alpha,beta-unsaturated polycarboxylic acid, with a polyhydric alcohol, e.g., a glycol. The unsaturated alkyd resin employed as a co-reactant with the unsaturated borazole is preferably one having an acid number not greater than 50, although in some cases resins having an acid number as high as 100 may be employed. The term "unsaturated alkyd resin" as used herein does not include within its meaning the conventional drying oil or drying oil acid-modified alkyd resins in the preparation of which an aromatic or a saturated aliphatic polycarboxylic acid or anhydride is used.

Illustrative examples of unsaturated alkyd resins that may be employed are those produced by reaction of the following ingredients: ethylene glycol and maleic anhydride; glycerine and maleic anhydride; diethylene glycol, maleic anhydride and phthalic anhydride; diethylene glycol and itaconic acid; ethylene glycol, maleic anhydride and succinic acid; ethylene glycol, maleic anhydride and tetrafluorosuccinic acid; ethylene glycol, itaconic acid and phthalic anhydride; diethylene glycol, maleic anhydride and tung oil acids; ethylene glycol, maleic anhydride, linseed oil acids and phthalic anhydride; diethylene glycol and maleic anhydride; ethylene glycol, maleic anhydride and stearic acid; diethylene glycol, maleic anhydride and decyl alcohol; ethylene glycol, maleic anhydride, octyl alcohol and acetic anhydride; diethylene glycol, fumaric acid, tetrahydroabietyl alcohol and linseed oil fatty acids; alpha-propylene glycol and maleic anhydride; diethylene glycol, fumaric acid and benzyl alcohol; diethylene glycol, fumaric acid and tetrahydroabietyl alcohol; ethylene glycol, fumaric acid and omega-hydroxydecanoic acid; diethylene glycol, fumaric acid and linseed oil fatty acid monoglycerides; etc. Reference is made to the following patents for more detailed information regarding the ingredients, the preparation, and additional examples of modified and unmodified unsaturated alkyd resins that may be copolymerized with the unsaturated borazole to yield new synthetic compositions having a wide variety of commercial applications: 2,409,633; 2,443,740; 2,443,741; 2,485,294; and 2,510,503.

Mixtures of any of the aforementioned polymerizable materials may be copolymerized with an unsaturated borazole of the kind embraced by Formula I. For example, one may copolymerize the aforesaid unsaturated borazole with an unsaturated alkyd resin alone, e.g., diethylene glycol maleate, etc., or, also alone, a compound containing a $—CH=C<$ grouping, more particularly a $CH_2=C<$ grouping (which compound is different from the unsaturated borazole), e.g., styrene, diallyl succinate, triallyl cyanurate, etc., or a mixture of such a resin and a compound containing a $—CH=C<$ grouping. Mixtures of different unsaturated alkyd resins and of different compounds containing a $—CH=C<$ grouping sometimes may be employed advantageously in making a copolymer thereof with the unsaturated borazole.

In the production of copolymers, the unsaturated borazole generally constitutes at least about 1% by weight of the mixture of copolymerizable materials, e.g., from 5% or 10% to 90% or 95%, or even as high as 98% or 99% by weight of the aforesaid mixture. The smaller proportions are generally employed when it is desired to impart a specific property or characteristic to the copolymer. For example, a small amount of the order of 1% to 10% of the unsaturated borazole may be incorporated into a polymerizable mass, containing one or more monomers that normally yield a linear polymer upon polymerization, in order to form a cross-linked polymerization product. In such applications the unsaturated borazole acts primarily as a cross-linking agent.

The copolymers of this invention will ordinarily have combined in the copolymer molecule from about 0.01 to about 50 mole percent of the unsaturated borazole and the other comonomer or comonomers constituting the remainder.

Any suitable means may be employed in effecting polymerization of the unsaturated borazole alone or admixed with one or more other unsaturated substances which are copolymerizable therewith. They are preferably polymerized under heat and while admixed with a polymerization catalyst, e.g., a free-radical initiator or catalyst (e.g., benzoyl peroxide or other organic peroxy compound, or an azo catalyst such, for instance, as alpha, alpha'-azodiisobutyronitrile).

Additional examples of peroxy type of free-radical catalysts are the various organic peroxy catalysts, illustrative examples of which latter are: the dialkyl peroxides, e.g., dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; urea peroxide; the various percarboxylic acids; the various percarbonates, persulfates, perborates, etc.; and others that will be apparent to those skilled in the art from the foregoing examples.

Additional examples of azo type of free-radical catalysts include the following:

dimethyl alpha,alpha′-azodiisobutyrate
alpha,alpha′-Azobis (alpha-methylbutyronitrile)
alpha,alpha′-Azobis (alpha-ethylbutyronitrile)
1,1′-Azodicyclopentanecarbonitrile Reference is made to Hunt U.S. Patent No. 2,471,959, dated May 31, 1949, for additional examples and for a generic description of compounds of this class.

Depending upon the particular monomer or monomeric mixture employed there may also be used to initiate polymerization, in addition to free-radical catalysts of the above types or kinds, ionizing radiations, ultraviolet light, ionic (including cationic and anionic) catalysts, etc. Examples of cationic catalysts are p-toluene sulfonic acid, sulfuric acid, phosphoric acid, aluminum chloride, stannic chloride, titanium tetrachloride, boron trifluoride, boron trifluoride-ethyl etherate and other Lewis-type catalysts, more particularly Friedel-Craft catalysts. Examples of anionic catalysts are metallic sodium and potassium, a potassium-naphthalene complex, amylsodium, amylpotassium, and the like.

The monomeric unsaturated borazole or mixture of copolymerizable ingredients can be polymerized in emulsion or in solution state to yield a homopolymer or a copolymer. Various inert organic solvents or diluents also may be employed, the choice depending upon the particular comonomer and catalyst used and among which may be mentioned: benzene, toluene, xylene, dioxane, n-heptane, tetrahydrofuran, methylene chloride, ethylene dichloride, anhydrous acetone, as well as others. When the reaction is effected in solution state, a temperature at or approaching the boiling temperature of the solution may be used if desired. The homopolymer or copolymer is then separated from the liquid medium (solvent or diluent) in which polymerization was effected by any suitable means, e.g., by filtration, centrifuging, solvent extraction, evaporation of the solvent or diluent, etc.

The polymerization can be effected continuously, semicontinuously or by a batch operation. Bulk or mass polymerization technique can be used; or polymerization can be effected in a solvent which is capable of dissolving the polymerizable substance and in which the latter is preferably inert; or in a liquid medium in which the polymerizable substance is soluble but the homopolymer or copolymer is insoluble; or by bead polymerization technique. The polymerization can be effected at atmospheric or at superatmospheric pressures, as desired or as conditions may require.

As indicated hereinbefore, a catalyst or catalytic influence is required in order to initiate the polymerization or if polymerization is to be effected in a reasonable or practical period of time. The concentration of catalyst employed varies considerably. Thus, depending upon the particular catalyst used and the kind and amount (if any) of copolymerizable substance that is being copolymerized with the unsaturated borazole, it may range from, for example, about 0.5 part or 1 part by weight of catalyst per thousand parts by weight of the polymerizable substance to a molar ratio of catalyst/polymerizable substance equal to or greater than 1.

The temperature of polymerization of the polymerizable substance or composition, at atmospheric or superatmospheric pressure, and under a catalytic influence such as that provided by an added polymerization initiator, can be varied over a wide range up to and including or slightly above the boiling point (at atmospheric pressure) of the mass (or of the lowest boiling component thereof), but should be below the decomposition temperature of the monomeric material or materials (i.e., the polymerizable composition). In most cases the polymerization temperature will be within the range of 15° C. to 150° C., more particularly within the range of 20°–30° C. (ordinary room temperature, to about 130° C., depending upon the particular polymerizable composition being polymerized, the particular catalyst used, the rapidity of polymerization wanted, and other influencing factors. With certain ionic catalysts, e.g., gaseous $BF_3$, a boron trifluoride-ethyl ether complex, concentrated sulfuric acid, anhydrous aluminum chloride, etc., a substantially lower polymerization temperature often advantageously may be used, e.g., temperatures ranging between −80° C. and 0° C. or +10° C. At the lower temperatures below the solidification point of the monomeric unsaturated borazole or of the mixture thereof with one or more other polymerizable substances, polymerization is usually effected while the polymerizable composition is dissolved or dispersed in a solvent or dispersion medium which is liquid at the polymerization temperature. The polymeric material is then separated from the liquid medium in which polymerization was effected by any suitable means, for example by techniques such as those mentioned hereinbefore for purposes of illustration.

In order that those skilled in the art may better understand how the present invention can be carried into effect, the following examples are given by way of illustration and not by way of limitation. All parts and percentages are by weight unless otherwise stated.

EXAMPLE 1

A. *Preparation of B,B′,B″-trichloro-N,N′,N″-triphenylborazole*

A three-necked, 500 ml. flask equipped with stirrer, Dry-Ice condenser, and a Claisen head provided with a nitrogen inlet tube and a "Drierite" drying tube is charged with 200 ml. of toluene (freshly distilled over sodium or preferably calcium hydride) and cooled in an ice-water bath while being swept with dry nitrogen. Boron trichloride (50 g.; 0.43 mole; slightly more than one equivalent to take care of slight loss due to hydrolysis) is distilled into the flask through the Dry-Ice condenser, causing a brownish-purple color to develop in the toluene solution. After replacing the drying-tube with an addition funnel and protecting the exit of the condenser from moisture by a drying tube, a solution of aniline (30.4 g.; 0.326 mole) in toluene (100 ml.) is added dropwise with stirring over a one-hour period. An immediate precipitate of the addition compound ($C_6H_5$—$NH_2$:$BCl_3$) separates from the purple-colored solution. The cooling bath is replaced by a heating mantle; the Dry-Ice condenser is also replaced by a water condenser, the outlet of which is connected by a rubber tubing to an inverted funnel held about 4 cm. above a beaker of water. The reaction mixture is then refluxed until evolution of HCl and $BCl_3$ has ceased (24 hours). During this period, the color of the solution changes from purple to a light brown. The solvent is slowly removed by distillation until the product begins to separate from solution. After allowing the mixture to cool to room temperature, the crystalline, almost colorless product is collected by rapid filtration. Yield: 32.6 g. (73%). A small portion recrystallized from dry benzene (filtered through glass wool) has M.P. 270°–272°; Jones and Kinney (J.A.C.S. 61, 1378 [1939])

report M.P. 265°–270°. Since the compound is quite susceptible to hydrolysis by moisture, it should be protected from moisture, e.g., by storing in a desiccator over a suitable drying agent or in a container to which enough benzene or toluene is added to wet the solid.

of the appropriate Grignard reagent and halogenoborazole equivalent to those employed in Example 1. The reactants and products are shown in the table which follows. From fair to good yields of product are obtained in the individual case.

TABLE

| Example | Halogenoborazole | Grignard Reagent | Product |
|---------|-----------------|------------------|---------|
| 2 | B,B′,B″-trichloroborazole | Allyl magnesium bromide | B,B′,B″-triallylborazole. |
| 3 | B,B′,B″ - trichloro - N,N′,N″ - triethyl - borazole. | do | B,B′,B″ - triallyl - N,N′,N″ - triethyl - borazole. |
| 4 | B,B′,B″ - trichloro - N,N′,N″ - tritolyl - borazole. | do | B,B,B″ - triallyl - N,N′,N″ - tritolyl - borazole. |
| 5 | B,B′,B″ - trichloro - N,N′,N″ - tricyclo - hexylborazole. | do | B,B′,B″ - triallyl - N,N′,N″ - tricyclo - hexylborazole. |
| 6 | B,B′,B″ - trichloro - N,N′,N″ - tribenzyl - borazole. | do | B,B′,B″ - triallyl - N,N′,N″ - tribenzyl - borazole. |

B. *Preparation of B,B′,B″-triallyl-N,N′,N″-triphenyl-borazole*

Allyl magnesium bromide is prepared in, for instance, the following manner:

Allyl bromide (26.4 g.; 0.218 mole) in 50 ml. of ether is added to 5.3 g. (0.218 mole) magnesium turnings covered with 101 ml. of ether. Reaction starts immediately upon the addition of a crystal of iodine. After all of the allyl bromide has been added, the Grignard mixture is refluxed for 2 hours. A clear, ether solution of allyl magnesium bromide is obtained.

The above solution is added dropwise over a 45-minute period to 15.0 g. (0.0364 mole) B,B′,B″-trichloro-N,N′,N″-triphenylborazole (product of A) suspended in 100 ml. of anhydrous ether. A mushy solid replaces the suspended B-trichloro-N-triphenylborazole during the course of the addition. After adding all the Grignard reagent, the reaction mass is refluxed for 2 hours, after which the unreacted allyl magnesium bromide is decomposed with saturated aqueous ammonium chloride solution. The amount of ammonium chloride solution to be added is determined by the point at which the magnesium salts separate from an almost colorless, clear ether solution. After decanting and washing the solid residue with ether, the combined ether solutions are dried over anhydrous magnesium sulfate for about 16 hours at refrigerator temperature. The ether solution is separated from the magnesium sulfate and concentrated to a volume of approximately 100 ml., at which point the solution is orange-yellow in color. Methanol is added to the refluxing solution until it becomes cloudy without depositing any crystalline material. After standing undisturbed at room temperature for several hours, nicely-formed, large crystals of product slowly separate from the solution. Precipitation is completed by placing the vessel containing the product in the refrigerator for about ½ hour or longer. The B,B′,B″-triallyl-N,N′,N″-triphenylborazole is collected by filtration and air-dried to give 12.2 g. of product (78% of theory); M.P. 95°–98° C. Recrystallization from an ether-methanol mixture yields colorless crystals; M.P. 98°–99° C. Analysis checks with the analysis of a sample of B,B′,B″-triallyl-N,N′,N″-triphenylborazole (prepared in essentially the same manner as that described above), M.P. 98°–99° C., and which analyzed as follows:

| | Carbon | Hydrogen | Nitrogen |
|---|---|---|---|
| Calculated for $C_{27}H_{30}N_3B_3$ | 75.59 | 7.05 | 9.79 |
| Found | 75.11 | 7.15 | 9.87 |

Essentially the same procedure is followed as described under Example 1 in preparing and isolating other borazoles of the kind embraced by Formula I, using amounts The following examples illustrate the preparation of homopolymers of the present invention.

EXAMPLE 7

Ten (10) parts of B,B′,B″-triallyl-N,N′,N″-triphenylborazole is dissolved in 90 parts of benzene (in which it is very soluble), and about 0.3 part of a 75% solution of pinane hydroperoxide in pinane is added thereto. The mixture is agitated to obtain a homogeneous solution, after which a portion is cast on a glass plate. The coated plate is placed in an oven maintained at about 150° C. After about 6 hours at this temperature homopolymerization of the monomer is evident. The resulting film of polymer is insoluble in benzene, which is a good solvent for the monomer.

EXAMPLE 8

Ten (10) g. of B - triallyl - N - triphenylborazole (B,B″,B‴-triallyl-N,N′,N″-triphenylborazole) and 1 ml. of di-tert.-butyl peroxide are mixed in a polymerization tube, which is deaerated and sealed under nitrogen. This tube is then placed in an oven at 130° C. for 24 hours, during which time an increase in the viscosity of the mass is evident. The product is removed from the tube, dissolved in toluene, and the homopolymer is precipitated from methanol. The polymer is filtered off and dried. The dried polymer is obtained in the form of a white, thermosetting, powdery solid. Its intrinsic viscosity in benzene at 30° C. is 0.0385, and its isopiestic molecular weight is between 2000 and 5000. It has a softening point of 173° C. and a flow point (temperature of flow) of 180° C. It is insoluble in water and anhydrous ethanol, but is soluble in benzene, chloroform, carbon tetrachloride, tetrahydrofuran, dioxane, dimethylformamide, methylene chloride (especially in the cold), anhydrous acetone, and n-heptane.

EXAMPLE 9

Ten (10) g. of B-triallyl-N-triphenylborazole and 2 ml. of di-tert.-butyl peroxide are mixed together in a polymerization tube, and polymerization of the monomer is carried out as described under Example 8 with the exception that the tube is kept in the 130° C. oven for 70 hours, yielding a very viscous liquid. The product is removed from the tube, dissolved in chlorobenzene, and the homopolymer is precipitated from methanol. The polymer is filtered off and dried for about 16 hours at 50° C. under vacuum. The dried polymer is a white powder having properties similar to the polymer of Example 8.

EXAMPLE 10

An insoluble, cross-linked homopolymer of B-triallyl-N-triphenylborazole is prepared as follows: Five (5) g. of the monomer and 3 ml. of di-tert.-butyl peroxide are sealed under vacuum in a polymerization tube after having been well mixed and efficient deaeration has been effected. The tube is placed in an oven maintained at 130° C. and is kept therein for 22 hours, yielding a solid, rosin-like homopolymer. This homopolymer does not soften when heated up to 300° C. and it is insoluble in aromatic hydrocarbon and halogenated aliphatic compounds such as those mentioned under Example 8.

An insoluble, cross-linked homopolymer of B-triallyl-N-triphenylborazole also is obtained when 3.6 g. of the soluble polymer (prepared as described under Example 8) is dissolved in 10 ml. of chlorobenzene, to which solution is added 2 ml. of di-tert.-butyl peroxide. The aforesaid ingredients are mixed together in a polymerization tube, which is sealed under vacuum after efficient deaeration. The tube is kept in a 130° C. oven for 22 hours, after which the reaction mass is removed from the tube and dumped into methanol to precipitate the homopolymer. The product is filtered off and dried, yielding a sandy-colored solid which does not soften when heated up to 300° C. It is insoluble in all ordinary solvents such as those in which the starting material (homopolymer of Example 8) is soluble.

The following examples illustrate the production of copolymers of the present invention.

EXAMPLE 11

Exactly the same procedure is followed as described under Example 7 with the exception that instead of 10 parts of B,B′,B″-triallyl-N,N′,N″-triphenylborazole (B-triallyl-N-triphenylborazole) there is used a mixture of 5 parts of B-triallyl-N-triphenylborazole and 5 parts of B-triallylborazole, whereby there is obtained a copolymer of the two different triallylborazoles that has properties similar to the homopolymer of Example 7 but of slightly lower softening point.

EXAMPLE 12

Same as in Example 8 with the exception that 5 g. of B-triallyl-N-tritolylborazole and 5 g. of B-triallyl-N-triphenylborazole are employed in place of 10 g. of B-triallyl-N-triphenylborazole. The resulting copolymer has a slightly higher softening point than the homopolymer of Example 8, but in most other respects its properties are similar to those of the Example 8 homopolymer.

EXAMPLE 13

An insoluble, cross-linked ternary polymer is prepared by the procedure described in the first paragraph of Example 10 using the following allylborazoles and amounts thereof instead of 5 g. of B-triallyl-N-triphenylborazole.

| Allylborazole | Grams |
| --- | --- |
| B-triallyl-N-tritolylborazole | 1.67 |
| B-triallyl-N-tricyclohexylborazole | 1.67 |
| B-triallyl-N-tribenzylborazole | 1.67 |

The resulting ternary polymer is insoluble in aromatic hydrocarbon and halogenated aliphatic compounds such as those mentioned under Example 8.

EXAMPLE 14

Example 8 is repeated exactly with the exception that the following allylborazoles and grams thereof are used in place of 10 parts of B-triallyl-N-triphenylborazole.

| Allylborazole: | Grams |
| --- | --- |
| B-triallyl-N-triphenylborazole | 8 |
| B-triallylborazole | 1 |
| B-triallyl-N-triethylborazole | 1 |

The resulting ternary polymer is insoluble in water and anhydrous ethanol, but is soluble in solvents such as those mentioned under Example 8 with reference to the solubility characteristics of the homopolymer of that example. An insoluble, cross-linked ternary polymer is prepared from 3.6 g. of the soluble polymer by following the procedure described in the second paragraph of Example 10 with reference to the insolubilization and cross-linking of a soluble homopolymer of B-triallyl-N-triphenylborazole that was prepared as described under Example 8.

EXAMPLE 15

| | | |
| --- | --- | --- |
| B-triallyl-N-triphenylborazole | g | 10 |
| Dibutyl fumarate | g | 10 |
| Di-tert.-butyl peroxide | ml | 2 | are mixed together and placed in a polymerization tube. After deaeration, the tube is sealed under vacuum and placed in a 130° C. oven for 24 hours. The resulting copolymer is a hard, brittle, slightly yellow solid when cold.

Dyes, pigments, opacifiers, lubricants, plasticizers, fillers, and other effect agents can be incorporated into the copolymer of this example to provide molding compositions from which can be produced molded articles suitable for a wide variety of industrial and domestic applications.

EXAMPLE 16

| | Parts |
| --- | --- |
| B-triallyl-N-triphenylborazole | 20.0 |
| Ethyl acrylate | 30.0 |
| Benzene | 150.0 |
| Di-tert.-amyl peroxide | 0.5 | are heated together under reflux at the boiling temperature of the mass for 7 hours. At the end of this period of time, the product is a viscous mass containing a copolymer of ethyl acrylate and the aforementioned B-triallyl-N-triphenylborazole. Films dried from the benzene solution of the copolymer are tough. The copolymer of this example is suitable for use as a component of coating compositions.

Instead of ethyl acrylate other comonomers, more particularly other esters of acrylic acid, e.g., methyl acrylate, propyl acrylate, isopropyl acrylate, n-butyl acrylate, isobutyl acrylate, sec.-butyl acrylate, tert.-butyl acrylate, amyl acrylate, hexyl acrylate, propenyl acrylate, cyclohexyl acrylate, phenyl acrylate, benzyl acrylate, etc., can be substituted in the above formulation thereby to obtain copolymer compositions of varying properties. As with ethyl acrylate, so too with such other comonomers the proportions of components can be varied as desired or as conditions may require, e.g., within ranges such as those mentioned in the portion of this specification prior to the examples.

EXAMPLE 17

A mixture of the various isomers of methyl-styrene (9.0 g.), B-triallyl-N-tritolylborazole (1.0 g.) and chlorobenzene (100 g.) are heated to 80° C., and 0.1 g. of benzoyl peroxide dissolved in 1.0 g. chlorobenzene is added. The mixture is heated for 7 hours at 80° C. The solution is then poured into 200 ml. of cold methanol. The resulting copolymer of methylstyrene and B-triallyl-N-tritolylborazole is removed by filtration, washed and dried. The dried copolymer, alone or with a dye, pigment, filler, plasticizer, lubricant, or other modifying agent, may be molded under heat and pressure, e.g., at 140° C. to 170° C. and under a pressure of 2000 to 5000 pounds per square inch.

The copolymer of this example in solution in, for example, methyl ethyl ketone, may be used as a coating composition or as a component of such compositions. For example, it may be applied to a surface of glass, metal, wood, or other material to be protectively finished, and the coated article then heated for from 1 to 3 hours at a temperature of the order of 100° C. to 120° C. to evaporate the solvent and to solidify the coating thereon.

EXAMPLE 18

| | | |
|---|---|---|
| B-triallyl-N-triphenylborazole | g | 10.0 |
| Styrene (re-distilled) | g | 2.4 |
| Benzoyl peroxide | g | 0.113 |
| Chlorobenzene | ml | 100 |

A mixture of the above ingredients is degassed and sealed under vacuum in a glass tube, which is placed in an 80° C. bath. After thus being heated for a total of 9¾ hours, the tube is cooled and the product is removed and dissolved in 50 ml. benzene. This benzene solution is added to 500 ml. methanol to precipitate the copolymer of B-triallyl-N-triphenylborazole and styrene. The copolymer is redissolved in 50 ml. benzene, and reprecipitated from methanol as above described to obtain a product which is only slightly yellow in color.

EXAMPLE 19

| | | |
|---|---|---|
| B-triallyl-N-triphenylborazole | g | 10.0 |
| Methyl methacrylate | g | 2.3 |
| Benzoyl peroxide | g | 0.113 |
| Chlorobenzene | ml | 100 |

Exactly the same procedure is followed as described under Example 17 in carrying out the copolymerization reaction. The reaction mass containing a copolymer of B-triallyl-N-triphenylborazole and methyl methacrylate is removed from the reaction tube and dissolved in 50 ml. benzene. This benzene solution is added to 500 ml. methanol to precipitate the copolymer, which turns gray on standing for 5 minutes. The copolymer is filtered off, dissolved in 50 ml. benzene and reprecipitated from 500 ml. methanol. This is repeated. The copolymer is still gray. It is redissolved in 50 ml. benzene and filtered, yielding a clear solution containing dissolved copolymer. The copolymer is reprecipitated from methanol, filtered off, dried, redissolved in 50 ml. benzene, and the resulting clear solution is filtered, using 200 ml. benzene in rinsing out the container. The clear solution is freeze-dried at 0° C. to obtain the copolymer, which gives a positive flame test for boron.

EXAMPLE 20

| | Parts |
|---|---|
| B-triallyl-N-triethylborazole | 2.5 |
| Methyl acrylate | 2.5 |
| Methyl methacrylate | 25.5 |
| Alpha,alpha'-azodiisobutyronitrile | 0.3 | are mixed together and charged to a heavy-walled glass tube, which thereafter is sealed under vacuum. Copolymerization is effected by heating the sealed tube in an 80° C. water bath for 60 hours and then in an oil bath as follows: 24 hours each at 100° C., 120° C., 135° C., and 150° C. The resulting ternary polymer of B-triallyl-N-triethyl-borazole, methyl acrylate, and methyl methacrylate can be molded under heat and pressure to yield a wide variety of molded articles for domestic and industrial uses.

EXAMPLE 21

| | Parts |
|---|---|
| B-triallylborazole | 10.0 |
| Acrylonitrile (redistilled) | 45.0 |
| Alpha,alpha'-azodiisobutyronitrile | 1.1 | are mixed together and charged to a heavy-walled glass tube, which thereafter is sealed under vacuum. Copolymerization is effected by heating the sealed tube as described under Example 19, yielding a solid copolymer of B-triallylborazole and acrylonitrile.

EXAMPLE 22

| | Parts |
|---|---|
| B-triallyl-N-tricyclohexylborazole | 5.0 |
| Vinylidene chloride | 145.0 |
| Di-tert.-butyl peroxide | 1.5 | are mixed and heated together in a closed vessel for 24 hours at 40° C., and for another 24 hours at 60° C., yielding a solid, thermoplastic copolymer of vinylidene chloride and the said allylborazole. This copolymer can be hot drawn to obtain monofilaments, rods, bars, tubes, etc., having a wide variety of commercial uses.

EXAMPLE 23

| | Parts |
|---|---|
| B-triallyl-N-tribenzylborazole | 100.0 |
| Vinyl acetate | 100.0 |
| Chlorobenzene | 200.0 |
| Alpha,alpha'-azodiisobutyronitrile | 2.0 |

The homogeneous solution of the above comonomers is refluxed for 12 hours. At the end of this time, the solvent and unreacted vinyl acetate are removed by vacuum evaporation. A solid copolymeric mass is obtained.

EXAMPLE 24

| | | |
|---|---|---|
| B-triallyl-N-triphenylborazole | g | 10.0 |
| Vinyl acetate | g | 2.0 |
| Benzoyl peroxide | g | 0.113 |
| Chlorobenzene | ml | 10 |

Exactly the same procedure is following as described under Example 17 in carrying out the copolymerization reaction with the exception that the time the reaction tube is heated at 80° C. is about 23 hours instead of 9¾ hours. After heating for about 2 hours, there is a slight but noticeable increase in viscosity, and the reaction mass has changed to a dark yellow color. At the end of the reaction period, the reaction mass containing a copolymer of the allyl borazole and vinyl acetate is dissolved in 50 ml. benzene, and the copolymer is precipitated by pouring the benzene solution into 500 ml. of petroleum ether. The copolymer is filtered off, washed with petroleum ether, and dried at room temperature. The dried copolymer is a reddish solid.

EXAMPLE 25

Same as in Example 22 with the exception that 50 parts methyl acrylate and 50 parts ethyl acrylate are substituted for 100 parts of vinyl acetate. Similar results are obtained.

EXAMPLE 26

A mixture comprising 60 parts of an unsaturated alkyd resin obtained by reaction between ethylene glycol, diethylene glycol and fumaric acid, 40 parts of B-triallylborazole, and 2 parts of benzoyl peroxide containing 50% inactive filler (triphenyl phosphate) is poured into a mold and cured therein for 12 hours at 60° C., 6 hours at 80° C., and 2 hours at 100° C. A hard, well-cured casting is obtained.

EXAMPLE 27

Thirty (30) parts of ethylene glycol fumarate sebacate (4:3:1 molar ratio) is mixed with 10 parts B-triallyl-N-triphenylborazole. To 12 parts of the resulting mixture are added 8 parts of wood flour filler and 1.5 parts of benzoyl peroxide containing 50% inactive filler (triphenyl phosphate). The resulting mixture is compacted by passage through cold rolls and disintegrated. The finely divided material thereby obtained is then placed in a disk mold preheated to 140° C., and left there under a pressure of about 3,500 pounds per square inch for about 30 minutes. The resulting molding is hard and well cured.

EXAMPLE 28

A uniform mixture of 25 parts of ethylene glycol fumarate sebacate (4:3:1 molar ratio), 10 parts of B-triallyl-N-triphenylborazole, and 0.4 part of di-tert.-butyl peroxide is spread evenly between five plies of ECC–11–112 Fiberglas cloth and the combination is held under slight pressure in a Carver press for about 40 minutes at about 150° C. The resinous copolymer component of the impregnated Fiberglas cloth becomes hard and the panel stiff.

EXAMPLE 29

The resin mixture of Example 27 is spread evenly between six plies of #720 paper, and the combination is subjected to the same curing conditions as the Fiberglas laminate of Example 27. The resulting panel is stiff, and the paper laminate is well cured.

EXAMPLE 30

Sixty-seven (67) parts of diethylene glycol fumarate sebacate (6:5:1 molar ratio), 33 parts of B-triallylborazole, 7 parts of paraformaldehyde, and 2 parts of benzoyl peroxide containing 50% inactive filler (triphenyl phosphate) are thoroughly mixed together in a suitable vessel and then heated at 100° C. A vigorous reaction occurs, accompanied by evolution of gas. As the mass polymerizes and sets, it undergoes about a 1.5-fold expansion and the cured mass is porous.

EXAMPLE 31

A substantially homogeneous mixture is made of 25 parts of B-triallyl-N-tritolylborazole and 50 parts of an unsaturated alkyd resin produced by reaction of the following reactants in the specified molar ratios:

| | Molar ratio |
|---|---|
| Propylene glycol | 6.6 |
| Phthalic anhydride | 4.0 |
| Fumaric acid | 2.6 |

The reaction between the alkyd-forming reactants is carried out in the presence of 0.008% of hydroquinone based on the weight of the alkyd.

To the mixture of the aforementioned allyl-substituted borazole and unsaturated alkyd resin is added 0.5 part of a polymerization catalyst comprising 60% methyl ethyl ketone hydroperoxide and 40% dimethyl phthalate as a solvent therefor; and, also, 0.2 ml. cobalt naphthenate solution, which is a xylene solution of cobalt naphthenate containing 2% cobalt as the metal.

A sample of the polymerizable composition produced as above described is heated at 80° C. for about 24 hours, yielding a hard copolymer of the unsaturated alkyd resin and B-triallyl-N-tritolylborazole.

EXAMPLE 32

Same as in Example 30 with the exception that the unsaturated alkyd resin is one which is produced by reaction of the following reactants in the specified molar ratios:

| | Molar ratio |
|---|---|
| Propylene glycol | 6.6 |
| Phthalic anhydride | 1.1 |
| Fumaric acid | 5.5 | and 1.0 part of the same catalyst used in Example 27 is employed. The reaction between the alkyd-forming reactants is carried out in the presence of 0.06% of di-(tert.-butyl) hydroquinone based on the weight of the original reactants forming the alkyd resin.

A sample of the polymerizable composition is heated on a steam bath at 100° C. A hard, opaque copolymer of the unsaturated alkyd resin and B-triallyl-N-tritolylborazole is obtained after 1 hour's heating.

EXAMPLE 33

| | Parts |
|---|---|
| Triallyl cyanurate | 50 |
| Diallyl phthalate | 25 |
| B-triallyl-N-triphenylborazole | 25 |
| Benzoyl peroxide | 1 | are mixed and heated together for 4 hours at 110° C., yielding a hard, resinous ternary polymer.

EXAMPLE 34

| | Parts |
|---|---|
| Diethylene glycol fumarate sebacate [1] | 300.0 |
| Triallyl cyanurate | 100.0 |
| B-triallyl-N-triphenyl-borazole | 100.0 |
| Di-tert.-butyl peroxide in solution in 10 parts dimethyl phthalate | 2.5 |

[1] NOTE.—This unsaturated alkyd resin is prepared by effecting reaction between 6 moles diethylene glycol, 5 moles fumaric acid, and 1 mole sebacic acid.

The above ingredients are mixed while warming on a steam bath to insure complete distribution of the solution of the peroxide catalyst and to obtain a homogeneous mass. A 2-ply laminated article having high heat resistance is made by curing, between glass plates, two superimposed sheets of glass cloth that are impregnated with the above polymerizable composition, for 3 hours at 130° C. and at contact pressure. The laminate is completely cured, hard, compact, and flexible. The ternary polymer of diethylene glycol fumarate sebacate, triallyl cyanurate and B-triallyl - N - triphenylborazole, which is produced in situ, fills the interstices of the sheets of glass cloth.

It will be understood, of course, by those skilled in the art that our invention is not limited to the specific ingredients named in the above illustrative examples nor to the particular proportions and methods of polymerization and copolymerization mentioned therein. For example, in place of the particular allylborazole specified in the individual example we may use any other allylborazole of the kind embraced by Formula I or mixtures thereof in any proportions. For most purposes we prefer to use B-triallyl-N-triphenylborazole. Also, in place of all or part of the particular co-reactant named in the individual example one can use other compounds containing a —CH=C< grouping, more particularly a $CH_2$=C< grouping and/or an unsaturated alkyd resin, numerous examples of which have been given hereinbefore.

The thermoplastic and thermosetting (or potentially thermosetting) polymerization products (polymers and copolymers) of this invention have a wide variety of applications. For instance, with or without a filler or other additive, numerous examples of which have been given hereinbefore, they may be used as molding compositions (or as components of molding compositions) from which molded articles are produced by molding the composition under heat and pressure, e.g., at temperatures of the order of 120° to 200° C. and under pressures ranging between 1,000 and 10,000 pounds per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions used in producing the polymers of our invention also can be used in the production of castings; as adhesives, for instance as binders for paper, glass, wood, rubber, etc., or in the production of optical devices containing a plurality of elements; in the treatment of paper or paper stock; and for various other purposes including those mentioned in some of the specific examples, and in the portion of this specification prior to the examples.

The polymers of this invention are unique in that they contain both ring boron and ring nitrogen combined in the polymer molecule. The boron tends to improve the flame-resisting properties of these polymers as compared with similar polymers in which boron is absent. They are further characterized by their improved thermal stability as compared with most of the other presently available polymers; and by their utility as, for example, neutron absorbers and scintillation counters.

In a manner similar to that described hereinbefore with reference to the production of homopolymers and copolymers of the kind embraced by Formula I, one also may prepare homopolymers and copolymers of compounds represented by the general formula

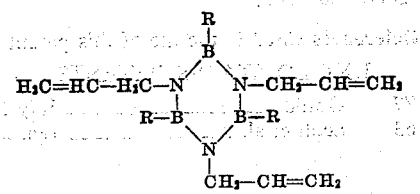

where R has the same meaning as given hereinbefore with reference to Formula I.

We claim:

1. A thermosetting polymer of a compound represented by the general formula

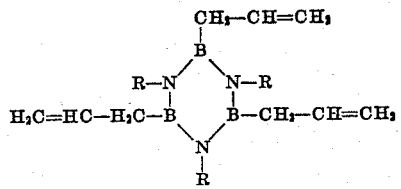

where R represents a member of the class consisting of hydrogen and alkyl, aralkyl, aryl, and alkaryl radicals.

2. A thermosetting polymer of B,B',B''-triallyl-N,N',N''-triphenylborazole.

3. A thermosetting homopolymer of a compound represented by the general formula

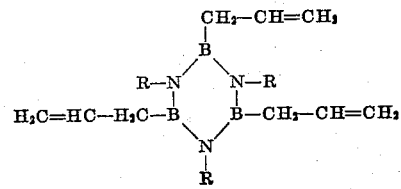

where R represents a member of the class consisting of hydrogen and alkyl, aralkyl, aryl, and alkaryl radicals.

4. Thermosetting, homopolymeric B,B',B''-triallyl-N,N',N''-triphenylborazole.

5. A composition comprising a copolymer of different copolymerizable ingredients comprising (1) a compound represented by the general formula

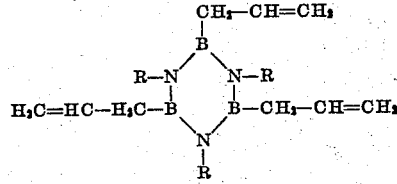

where R represents a member of the class consisting of hydrogen and alkyl, aralkyl, aryl, and alkaryl radicals and (2) at least one member of the class consisting of (a) monomers having a $CH_2=C<$ grouping, (b) polymerizable unsaturated alkyd resins obtained by a condensation reaction of ingredients comprising an aliphatic polyhydric alcohol and an ethylenically unsaturated, aliphatic, polycarboxylic acid, and (c) saturated monohydric alcohol esters of ethylenically unsaturated, aliphatic, polycarboxylic acids.

6. A composition comprising a copolymer as in claim 5 wherein the compound of (1) is B,B',B''-triallyl-N,N',N''-triphenylborazole.

7. A composition comprising a copolymer as in claim 5 wherein the compound of (2) is one which contains a $CH_2=C<$ grouping.

8. A composition comprising a copolymer as in claim 5 wherein the compound of (2) is dibutyl fumarate.

9. A composition comprising a copolymer as in claim 5 wherein the compound of (2) is an alkyl ester of methacrylic acid.

10. A composition comprising a copolymer as in claim 9 wherein the alkyl ester of methacrylic acid is methyl methacrylate.

11. A composition comprising a copolymer of different copolymerizable ingredients comprising (1) B,B',B''-triallyl-N,N',N''-triphenylborazole, and (2) a compound which contains a $CH_2=C<$ grouping.

12. A composition comprising a copolymer as in claim 11 wherein the compound of (2) is a vinyl compound.

13. A composition comprising a copolymer as in claim 12 wherein the vinyl compound is a vinyl aromatic compound.

14. A composition comprising a copolymer as in claim 13 wherein the vinyl aromatic compound is styrene.

15. A composition comprising a copolymer as in claim 12 wherein the vinyl compound is a vinyl aliphatic compound.

16. A composition comprising a copolymer as in claim 15 wherein the vinyl aliphatic compound is vinyl acetate.

17. The method of preparing a new synthetic composition which comprises polymerizing, under heat and while admixed with a polymerization catalyst selected from the class consisting of free-radical polymerization catalysts and ionic polymerization catalysts, a compound represented by the general formula

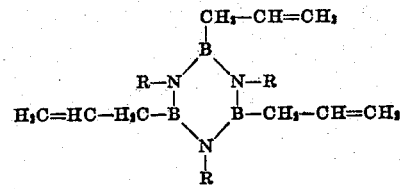

where R represents a member of the class consisting of hydrogen and alkyl, aralkyl, aryl, and alkaryl radicals.

18. The method of preparing a new synthetic composition which comprises polymerizing, under heat and while admixed with a polymerization catalyst selected from the class consisting of free-radical polymerization catalysts and ionic polymerization catalysts, a polymerizable composition comprising a plurality of different, copolymerizable ingredients comprising (1) a compound represented by the general formula

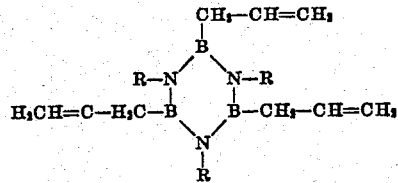

where R represents a member of the class consisting of hydrogen and alkyl, aralkyl, aryl, and alkaryl radicals, and (2) at least one member of the class consisting of (a) monomers having a $CH_2=C<$ grouping, (b) polymerizable unsaturated alkyd resins obtained by a condensation reaction of ingredients comprising an aliphatic polyhydric alcohol and an ethylenically unsaturated, aliphatic, polycarboxylic acid, and (c) saturated monohydric alcohol esters of ethylenically unsaturated, aliphatic, polycarboxylic acids.

19. A polymer of a compound represented by the general formula

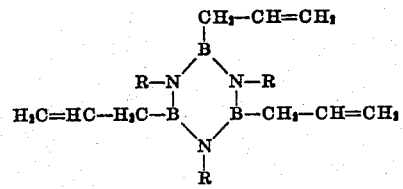

where R represents a member of the class consisting of hydrogen and alkyl, aralkyl, aryl, and alkaryl radicals, said polymer having an isopiestic molecular weight of at least 2000.

20. A polymer of a compound represented by the general formula
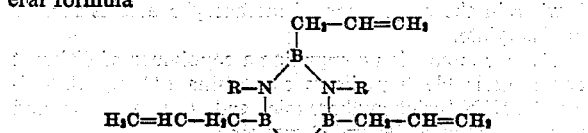
where R represents a member of the class consisting of hydrogen and alkyl, aralkyl, aryl, and alkaryl radicals, said polymer having an isopiestic molecular weight of between 2000 and 5000.
References Cited in the file of this patent
UNITED STATES PATENTS
2,754,177    Gould _____ July 10, 1956
2,821,463    Scott et al. _____ Jan. 28, 1958

UNITED STATES PATENT OFFICE
CERTIFICATE OF CORRECTION

Patent No. 2,954,361                                              September 27, 1960

Stephen J. Groszos et al.

It is hereby certified that error appears in the printed specification of the above numbered patent requiring correction and that the said Letters Patent should read as corrected below.

Column 2, line 52, for "B-triallylborazloe" read -- B-triallylborazole --; column 8, line 15, after "temperature" strike out the comma and insert instead a closing parenthesis; line 33, for "sutable" read -- suitable --; column 9, line 3, for "mosture" read -- moisture --; columns 9 and 10, in the table, second column, line 2 thereof, for "B,B',B' -trichloro-" read -- B,B',B"-trichloro- --; same table, under the heading "Product", and opposite "do", second occurrence, for "B,B,B"-triallyl-N,N',N"-tritolyl-" read -- B,B',B"-triallyl-N,N',N"-tritolyl- --.

(SEAL)           Signed and sealed this 11th day of April 1961.

Attest:
ERNEST W. SWIDER                              ARTHUR W. CROCKER
Attesting Officer                                    Acting Commissioner of Patents